United States Patent
Yamada

[15] 3,690,416
[45] Sept. 12, 1972

[54] PARKING BRAKE FOR AUTOMATIC TRANSMISSION

[72] Inventor: Katsuo Yamada, Yokohama, Japan
[73] Assignee: Nissan Motor Company, Limited, Yokohoma, Japan
[22] Filed: July 17, 1970
[21] Appl. No.: 55,670

[52] U.S. Cl. .......................... 188/69, 188/31
[51] Int. Cl. ............................. B60t 1/02
[58] Field of Search ............. 188/31, 69; 192/4 A

[56] References Cited

UNITED STATES PATENTS

| | | | |
|---|---|---|---|
| 3,187,846 | 6/1965 | Powell | 188/69 |
| 3,213,968 | 10/1965 | Platz | 188/69 |

FOREIGN PATENTS OR APPLICATIONS

| | | | |
|---|---|---|---|
| 610,855 | 10/1960 | Italy | 188/31 |

Primary Examiner—Duane A. Reger
Attorney—McCarthy, Depaoli & O'Brien

[57] ABSTRACT

A parking brake for use with an automatic power transmission mechanism including a parking gear which is engaged or disengaged by a brake pawl upon manual shifting motion of a control rod. A cam portion is carried by the control rod and is moved to cause the brake pawl to engage and disengage in the parking position with a stationary housing. Intermediate members such as rollers or balls are situated in a spaced defined between the brake pawl and the cam portion and/or between the cam portion and the stationary housing in order to minimize the driver's effort which is necessary to control the motion of the control rod.

26 Claims, 18 Drawing Figures

INVENTOR
KATSUO YAMADA
BY
ATTORNEYS

PARKING BRAKE FOR AUTOMATIC TRANSMISSION

This invention relates to parking brake mechanism and more particularly to a parking brake for use with an automatic power transmission mechanism in which provision is made for reducing to a minimum the driver's effort that is necessary to control the operation of the parking brake.

Automotive vehicles having an automatic power transmission mechanism usually are equipped with a parking brake which is capable of anchoring the driven shaft of the mechanism. The parking brake is composed of a parking gear mounted on the driven shaft and a brake pawl which is engageable meshing with the parking gear to lock it against rotation in either direction upon manual shifting motion of a control rod to a parking position. The control rod carries a cam portion which, upon application thereto of the shifting motion, is engageable with a heel portion of the brake pawl and a portion of a stationary housing to move the brake pawl into engagement with the parking gear. If, however, the tooth of the brake pawl is not meshed with two adjacent teeth of the parking gear, it will be impossible for the brake pawl to move toward its parking position. Provision is made in the parking brake mechanism for permitting the brake pawl to move toward the parking position in the case described above.

For this purpose the cam portion may be mounted for axial movement on the control rod and normally is biased into engagement with a portion of the control rod by a spring means. Thus, if the tooth of the brake pawl is positioned directly adjacent to a tooth ridge of the parking gear, the cam portion will be urged out of engagement with the portion of the control rod. This causes the spring means to yield and exert a pressure on the cam portion that tends to urge it toward its parking position. When the driven shaft moves slightly, the tooth of the brake pawl is brought into a meshing position with the two adjacent teeth of the parking gear and then the brake pawl snaps into its parking position.

The parking brake mechanism described in U.S. Pat. No. 3,213,968 employs a ratchet lever that normally is urged by the action of a spring into engagement with a boss formed on a stationary housing. The ratchet lever has a cam surface formed thereon so that, upon manual shifting motion of a control rod, a cam portion carried thereby is caused to engage and ride over the cam surface of the ratchet lever to urge the brake pawl into engagement with the parking gear thereby locking it against rotation in either direction. If, however, the tooth ridge of the brake pawl is positioned in abutment with a tooth ridge of the parking gear, the ratchet lever will be urged out of engagement with the boss against the action of the spring to permit continuous motion of the control rod as the operator continues to move it to a position that would correspond to the parking position. Upon subsequent movement of the driven shaft, the tooth of the brake pawl is brought into meshing with two adjacent teeth of the parking gear and then the spring force will snap the ratchet lever into the parking position thereby causing the brake pawl to lock the parking gear against rotation in either direction.

In the above-described parking brake mechanisms, however, a relatively large amount of force is necessary to control the driver-operated control rod, especially to release it from contact with the brake pawl when it is locking the parking gear, since the cam portion carried by the control rod is in sliding contact with the brake pawl and with the stationary housing or the ratchet lever.

It is therefore an object of this invention to provide a parking brake for use with an automatic power transmission mechanism, which brake requires a minimum amount of effort to control the motion of the control rod for causing the brake pawl to engage or disengage with the parking gear.

It is another object of this invention to provide a parking brake mechanism in which a minimum amount of friction is involved since there is substantially no sliding action between the cooperating brake elements.

Further features and objects of this invention will become apparent from the following description perused in connection with the accompanying drawings, in which.

Figure 1:
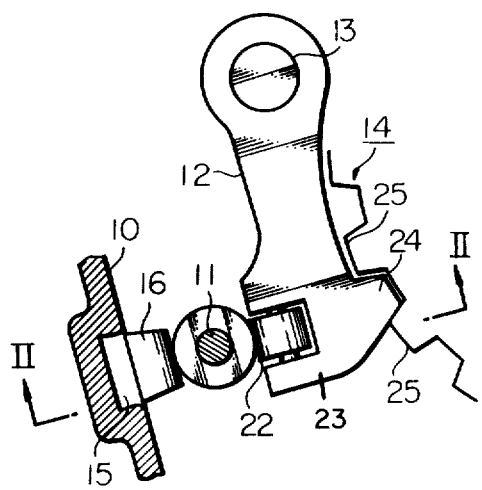
FIG. 1 is a schematic diagram showing a parking brake for use with an automatic power transmission mechanism constructed in accordance with one embodiment of this invention.
Figure 2:
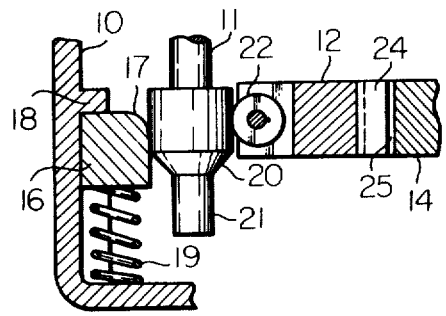
FIG. 2 is a cross section taken on the line II—II of FIG. 1, showing a parking gear when it is locked preventing rotation by a brake pawl.

Referring first to FIGS. 1 and 2, the parking brake mechanism depicted comprises a housing 10, a control rod 11 mounted for axial movement on the stationary housing 10, a brake pawl 12 mounted on the housing 10 for oscillation about an axis 13, and a parking gear 14 mounted on a driven shaft (not shown) which is rotatably journaled in the housing 10. The housing 10 has formed therein a guide recess 15 that is adapted to receive a reaction member 16 for reciprocation therein in a direction generally parallel to the axis of the control rod 11. As best shown in FIG. 2, the reaction member 16 has a cam surface 17 formed thereon and may be normally biased by a compression spring 19 into engagement with a boss 18 formed on the housing. The arrangement for the guide recess 15, reaction member 16 and compression spring 19 can be modified by using a roller or a tension spring in place of these members. The control rod 11 carries a generally frusto-conical cam portion 20 and extends as a straight rod until an end 21. The other end (not shown) of the control rod 11 is connected to a manually operable member (not shown) through a mechanical linkage mechanism. The control rod 11 moves axially, i.e., in a direction generally parallel to the axis of the driven shaft when the vehicle driver applies a shifting motion to the manually operable member. The control rod 11 is positioned relative to the reaction member 16 such that when the control rod 11 is advanced downwardly as viewed in FIG. 2 upon application thereto a shifting motion the cam portion 20 engages the cam surface 17.

The brake pawl 12 has a roller 22 journaled in the heel portion 23 thereof. The roller 22 is engaged by the cam portion 20 of the control rod 11 when it is shifted to the parking position. The brake pawl 12 is formed with a tooth 24 which is adapted to be engaged in the valley between two adjacent teeth 25 of the parking gear 14. When the tooth 24 of the brake pawl 12 is positioned in the valley as shown in FIGS. 1 and 2, the parking gear 14 is thereby locked preventing rotation of the driven shaft in either direction.

Figure 3:
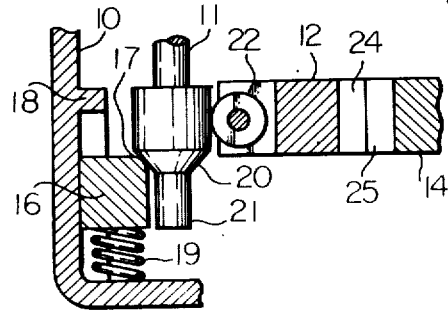
FIG. 3 is a view similar to FIG. 2, but showing the case where the parking gear is not locked, the tooth ridge of the brake pawl being positioned in abutment with a tooth ridge of the parking gear.

During normal operation of the parking brake mechanism the control rod 11 is forced downwardly, as viewed in FIG. 2, so that the cam portion 20 is caused to engage with both the cam surface 17 of the reaction member 16 and the roller 22. If the pawl tooth 24 is meshed with the teeth 25 of the parking gear 14, the cam portion 20 of the control rod 11 will ride over the cam surface 17 of the reaction member 16 as the rod 11 is further advanced downwardly as viewed in FIG. 2. As this occurs, the brake pawl 12 will swing about the axis 13 toward the parking position to lock the parking gear 14 preventing rotation in either direction. If, however, the pawl tooth 24 is not in a meshing position, it will be impossible for the brake pawl 12 to move toward the parking position, as shown in FIG. 3. In this instance, the reaction member 16 will be urged downwardly as viewed in FIG. 3 to permit continuous motion of the control rod 11 as the vehicle driver continues to move the manually operable member to a position that would correspond to the parking position. This causes the spring 19 to be compressed and exert a bias pressure on the brake pawl 12 that tends to urge it toward the parking position. When the driven shaft rotates slightly, the pawl tooth 24 is brought into mesh in the valley between the two adjacent teeth 25 of the parking gear 14 and the brake pawl then snaps into parking position as shown in FIGS. 1 and 2. It should be noted in this connection that the spring 19 has a strength such that it is not yielding by the downward movement applied to the control rod, if the pawl tooth 24 is meshed properly with the two adjacent teeth 25 of the parking gear 14, but is compressed by the movement if the tooth 24 is not meshed with the parking gear 14.

A minimum amount of friction is involved in this instance since there is no sliding action whatsoever between the cam portion 20 and the brake pawl 12, the roller 22 being in rolling contact with the cam portion 20. Thus, the driver's effort that is necessary to control the movement of the control rod can be reduced to a minimum.

Figure 4:
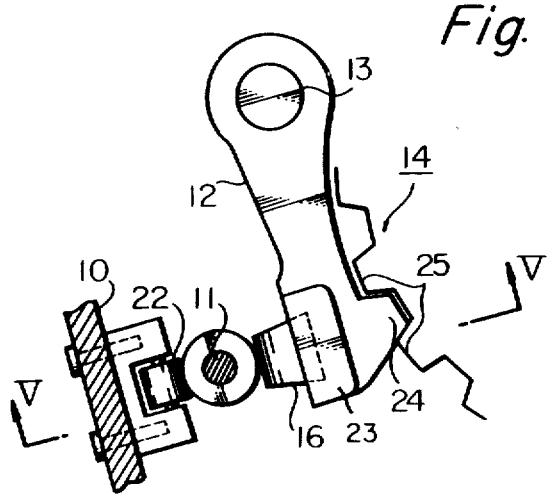
FIG. 4 is a schematic diagram showing a parking brake according to another embodiment of this invention.
Figure 5:
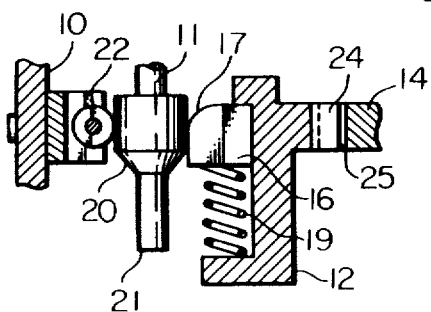
FIG. 5 is a cross section taken on the line V—V of FIG. 4, showing a parking gear when it is locked preventing rotation by a brake pawl.
Figure 6:
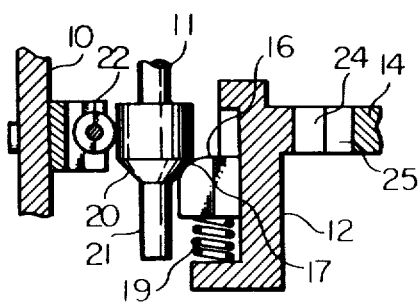
FIG. 6 is a view similar to FIG. 5, but showing the case where the parking gear is not locked, the tooth ridge of the brake pawl being in abutment with a tooth ridge of the parking gear.

Referring next to FIGS. 4, 5 and 6, there is shown a modification of a parking brake mechanism which is similar to that shown in FIGS. 1, 2 and 3 except that the roller is mounted on a stationary housing and the reaction member and spring assembly is mounted on the brake pawl. The elements that are common in the mechanism described with reference to FIGS. 1, 2 and 3 have been designated hereinafter by like reference numerals and characters.

In the embodiment of FIGS. 4, 5 and 6, the cam portion 20 will ride over the cam surface 17 of the reaction member 16 reciprocably mounted on the brake pawl 12 during normal operation of the parking brake. When the reaction member 16 assumes the position shown in FIGS. 4 and 5, the brake pawl will have assumed the parking position. If the pawl tooth 24 is not in mesh with the two adjacent teeth 25 of the parking gear 14, however, the compression spring 19 will bias the brake pawl 12, as shown in FIG. 6, thereby allowing continuous movement of the manually operable member. Upon subsequent movement of the driven shaft carrying the parking gear, however, the spring force of the compression spring 19 will snap the brake pawl 12 into the parking position as the reaction member 16 assumes the position shown in FIG. 5.

Referring to FIGS. 7 through 12, still another parking brake mechanism depicted is modified from that shown in FIGS. 1 through 3 in that the cam portion and spring assembly is replaced by a ball and recess assembly and the cam portion is reciprocably mounted on the control rod.

Figure 7:
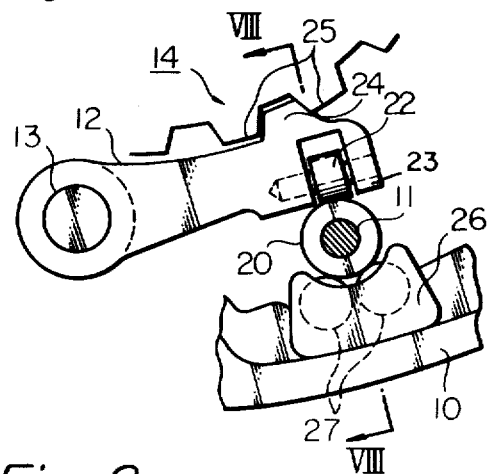
FIG. 7 is a schematic diagram showing a parking brake according to still another embodiment of this invention.
Figure 8:
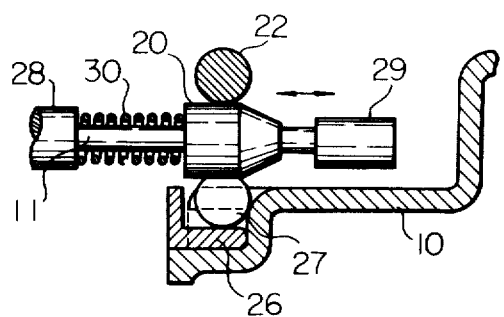
FIG. 8 is a cross section taken on the line VIII—VIII of FIG. 7.

A recess or guide 26, which is provided in a stationary housing 10, is adapted to receive one or a plurality of balls 27 for limited movement therein, two balls 27 being employed in this embodiment as best seen in FIG. 7. The guide 26 may be made of sintered alloy or other antifriction alloys. The ball or balls 27 may be replaced by a roller of cylindrical or gourd-like shape or other round member. The control rod 11 carries a first and second stops 28 and 29, respectively, between which the cam portion 20 is mounted for slidable reciprocation on the control rod 11. Interposed between the first stop 28 and the cam portion 20 is a spring 30 which normally biases the cam portion 20 into engagement with the second stop 29. These stop means 28 and 29 may be the larger diameter portions formed on the control rod 11 or other suitable rings mounted thereon. FIG. 8 shows the parking brake mechanism when it assumes the parking position, with the brake pawl 12 in engagement with the parking gear 14.

Figure 9:
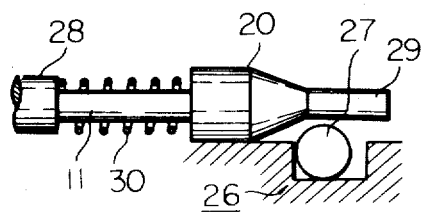
FIGS. 9 through 12 are views similar to FIG. 8, showing the relationship between a cam portion, which in this instance is movably mounted on a control rod and a reaction member under different operating conditions.
Figure 10:
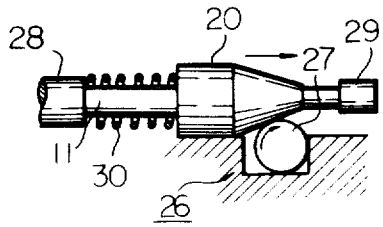
Figure 11:
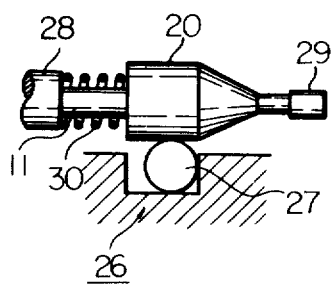
Figure 12:
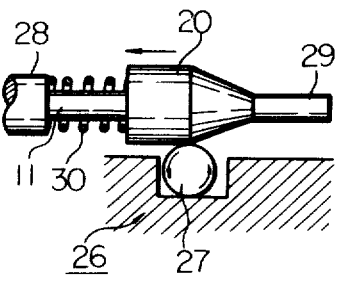
Figure 13:
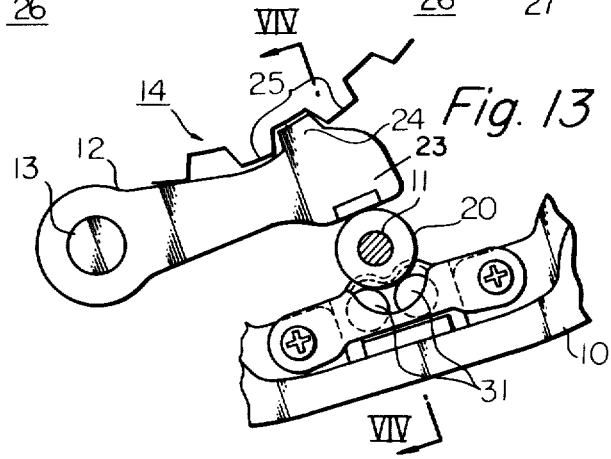
FIG. 13 is a schematic diagram showing a parking brake according to a further embodiment of this invention.

During normal operation of the parking brake mechanism, the control rod 11 is urged in a right-hand direction as viewed in FIGS. 8 through 12. Before the cam portion 20 is brought into engagement with the ball or balls 27, the spring 30 will not yield, as shown in FIG. 9. The control rod 11 is further shifted in a right-hand direction to cause the cam portion 20 to engage with the ball or balls 27. Subsequent motion of the control rod 11 in a right-hand direction causes the cam portion 20 to ride over the ball or balls 27 and simultaneously causes the spring 30 to yield, as shown in FIG. 10, because the movement of the ball or balls 27 is limited by the wall of the recess or guide 26. When this occurs, the brake pawl is urged toward the parking position by the spring 30. If the pawl tooth 24 is meshed with a valley between two adjacent teeth 25 of the parking gear 14, the cam portion 20 will fully ride over the ball or balls 27, as shown in FIGS. 8 and 11, to cause the brake pawl 12 to swing toward the parking position thereby locking the parking gear 14 preventing rotation of the driven shaft in either direction. If, however, the pawl tooth 24 is not in mesh with a valley between two adjacent teeth 25 of the parking gear 14, the spring 30 will bias the brake pawl 12 thereby allowing continued movement of the manually operable member. Upon subsequent movement of the driven shaft, however, the action of the spring 30 will snap the brake pawl 12 into the parking position. FIG. 12 shows the case where the ball or balls 27 rotate in a counterclockwise direction as the control rod 11 is retarded in a left-hand direction to disengage the parking brake mechanism.

In this embodiment, there is no sliding action whatsoever between the cooperating brake elements, resulting in a minimum amount of friction. Although the ball or balls 27 cannot possibly roll in a clockwise direction as viewed in FIG. 10 when the ball or balls 27 are urged against the wall of the recess 26, however, a small amount of friction will then develop between the ball or balls 27 and the cam portion 20 since the cam portion 20 is not strongly urged against the ball or balls 27 as the brake pawl 12 is about to engage with the parking gear 14.

FIGS. 13 through 18 show another modification of the parking brake of this invention, which is modified from that shown in FIGS. 1 through 3 in that the cam and spring assembly is replaced by a ball and spring assembly.

Figure 14:
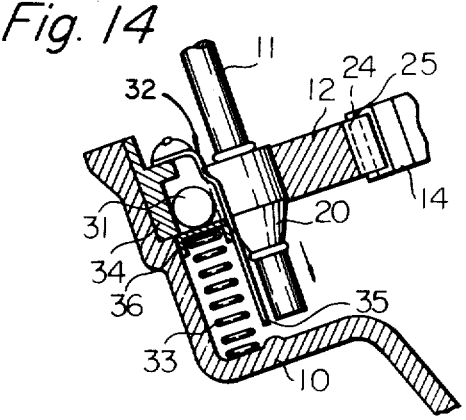
FIG. 14 is a cross section taken on the line XIV—XIV of FIG. 13.
Figure 15:
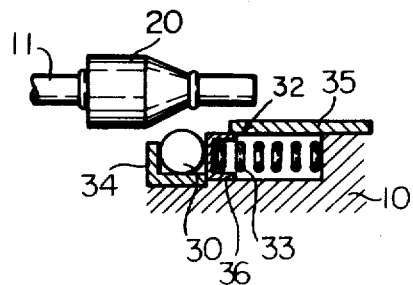
FIGS. 15 through 18 are views similar to FIG. 14, showing the relationship between a cam portion carried by a control rod and a reaction member under different operating conditions.
Figure 16:
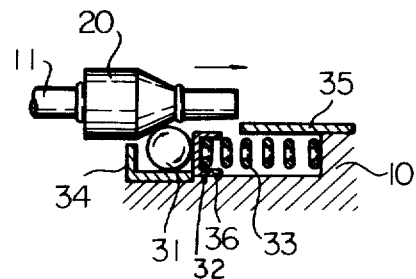

The ball and spring assembly comprises, in this instance, one or a plurality of balls 31 mounted for limited movement within a guide 32 and a spring 33 mounted within the guide 32 for normally biasing the ball or balls 31 into engagement with a stop 34 which forms one end wall of the guide 32. The guide 32 also includes a cover 35 made of steel, at least one end of which is bolted or otherwise secured to the boss or stop 34, and a ball seat mounted on one end of the spring 33 for retaining the ball or balls 31. The stop or boss member 34 on which the ball or balls 31 are reciprocally slidable is made of sintered alloy or other antifriction alloys and is secured to the stationary housing 10. The stop or boss member 34 is so sized as to allow the limited movement of the ball or balls 31 even when the ball seat 36 is in abutting engagement therewith. The ball or balls 31 may be replaced by a roller of cylindrical, gourd-like or spool-like shape or other round members, if desired. FIG. 14 shows the parking brake mechanism when it assumes the parking position, with the pawl 12 engaging the parking gear 14.

Figure 17:
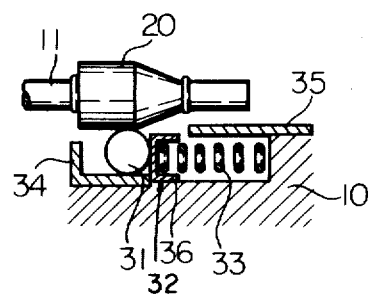
Figure 18:
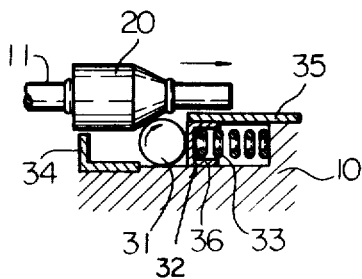

In operation movement of the control rod 11 in a right-hand direction as viewed in FIGS. 15 through 18 causes the cam portion 20 to engage the ball or balls 31, urging the ball or balls 31 in a right-hand direction. As this occurs, the ball or balls 31 will roll in a clockwise direction causing the spring 33 to yield and exert a bias pressure on the brake pawl 12 that tends to urge it toward the parking position, shown in FIG. 16. If the tooth 24 of the brake pawl 12 is in mesh with the two adjacent teeth 25 of the parking gear 14, the brake pawl 12 will move toward the parking position under the influence of the action of the cam portion 20 as the cam portion 20 is advanced in a right-hand direction and rides over the ball or balls 31, as shown in FIG. 17. If, however, the pawl tooth 24 is not in mesh with the two adjacent teeth 25 of the parking gear 14, the spring 33 will bias the brake pawl 12 thereby allowing continuous motion of the manually operable member. Upon subsequent movement of the driven shaft, the spring action of the spring 33 will snap the brake pawl 12 into the parking position.

In this embodiment, the cam portion 20 is in rolling contact with the ball or balls 31, resulting in a minimum amount of friction. Thus, a minimum amount of the driver's effort is necessary to control the movement of the control rod 11.

What is claimed is:

1. A parking brake for an automatic transmission mechanism of a motor vehicle, comprising in combination:
   1. an output shaft of the transmission mechanism rotatably journaled in a stationary housing of the vehicle;
   2. a toothed parking gear secured to said output shaft for rotation therewith; position, as
   3. a toothed brake pawl having a heel portion formed thereon and mounted on said stationary housing for oscillation into and out of meshing engagement with said parking gear to prevent rotation thereof;
   4. a control rod adapted to be manually shifted for movement in a direction generally parallel to the axis of said output shaft;
   5. a cam portion carried by said control rod and having a cam surface formed thereon;
   6. intermediate means including rotatable means disposed in at least one of the spaces formed in the heel portion of said brake pawl and between said cam portion of said control rod and said stationary housing, and reaction means having a cam surface formed thereon and disposed in the other of said spaces, both of said rotatable means and the cam surface of said reaction means being shaped and sized to keep abutting engagement with the cam surface of said cam portion thereby reducing operational frictions effected therebetween upon movement of said cam portion with respect to said intermediate means; and
   7. spring means for biasing either of said cam portion, rotatable means and reaction means in such a direction that said brake pawl is kept out of meshing engagement with said parking gear, whereby upon manual shifting of said control rod said cam portion is yieldably moved against the biasing action of said spring means to its parking position in which said parking gear is in meshing engagement with said brake pawl.

2. A parking brake according to claim 1, wherein said cam portion is formed integral with said control rod.

3. A parking brake according to claim 1, wherein said cam portion is adapted to reciprocate on said control rod.

4. A parking brake according to claim 2, wherein said rotatable means is provided in the heel portion of said brake pawl.

5. A parking brake according to claim 2, wherein said rotatable means is provided between said stationary housing and said cam portion.

6. A parking brake according to claim 2, wherein said rotatable means are provided both between said brake pawl and said cam portion and between said stationary housing and said cam portion.

7. A parking brake according to claim 2, wherein said rotatable means has one or a plurality of balls.

8. A parking brake according to claim 2, wherein said rotatable means has a roller of cylindrical shape.

9. A parking brake according to claim 2, wherein said rotatable means has a roller of gourd-like shape.

10. A parking brake according to claim 2, wherein said rotatable means has a roller of spool-like shape.

11. A parking brake according to claim 7, further comprising guide means for guiding said rotatable means, wherein said spring means is provided in said guide means.

12. A parking brake according to claim 11, further comprising a ball seat mounted on one end of said spring means for retaining said rotatable means and a stop member formed on one end wall of said guide means and so sized as to allow limited movement of said rotatable means even when said ball seat is in abutting engagement therewith.

13. A parking brake according to claim 2, wherein said reaction means is provided for reciprocation between said brake pawl and said cam portion.

14. A parking brake according to claim 2, wherein said reaction means is provided for reciprocation between said housing and said cam portion.

15. A parking brake according to claim 2, wherein said reaction means and said rotatable means are provided, respectively, between said brake pawl and said cam portion and between said housing and said cam portion.

16. A parking brake according to claim 2, wherein said reaction means and said rotatable means are provided, respectively, between said stationary housing and said cam portion and in the heel portion of said brake pawl.

17. A parking brake according to claim 2, further comprising guide means for guiding said reaction means, wherein said spring means is provided in said guide means.

18. A parking brake according to claim 3, wherein said rotatable means is provided in the heel portion of said brake pawl.

19. A parking brake according to claim 3, wherein said rotatable means is provided between said stationary housing and said cam portion.

20. A parking brake according to claim 3, wherein said rotatable means are provided both in the heel portion of said brake pawl and said cam portion and between said stationary housing.

21. A parking brake according to claim 3, wherein said rotatable means has one or a plurality of balls.

22. A parking brake according to claim 3, wherein said rotatable means has a roller of cylindrical shape.

23. A parking brake according to claim 3, wherein said rotatable means has a roller of gourd-like shape.

24. A parking brake according to claim 3, wherein said rotatable means has a roller of spool-like shape.

25. A parking brake according to claim 21, further comprising guide means for guiding said rotatable means for limited movement therein, wherein said spring means is mounted on the cam portion.

26. A parking brake according to claim 25, further comprising first and second stop members carried by said control rod and so sized in diameter as to allow said cam portion to slidably reciprocate therebetween, wherein said spring means is interposed between said first stop member and said cam portion.

* * * * *